Feb. 17, 1970  P. FRYKLUND  3,495,802
VALVE FOR HIGH PRESSURE OPERABLE IN CONTINUOUS CONTROL
Filed Oct. 9, 1967
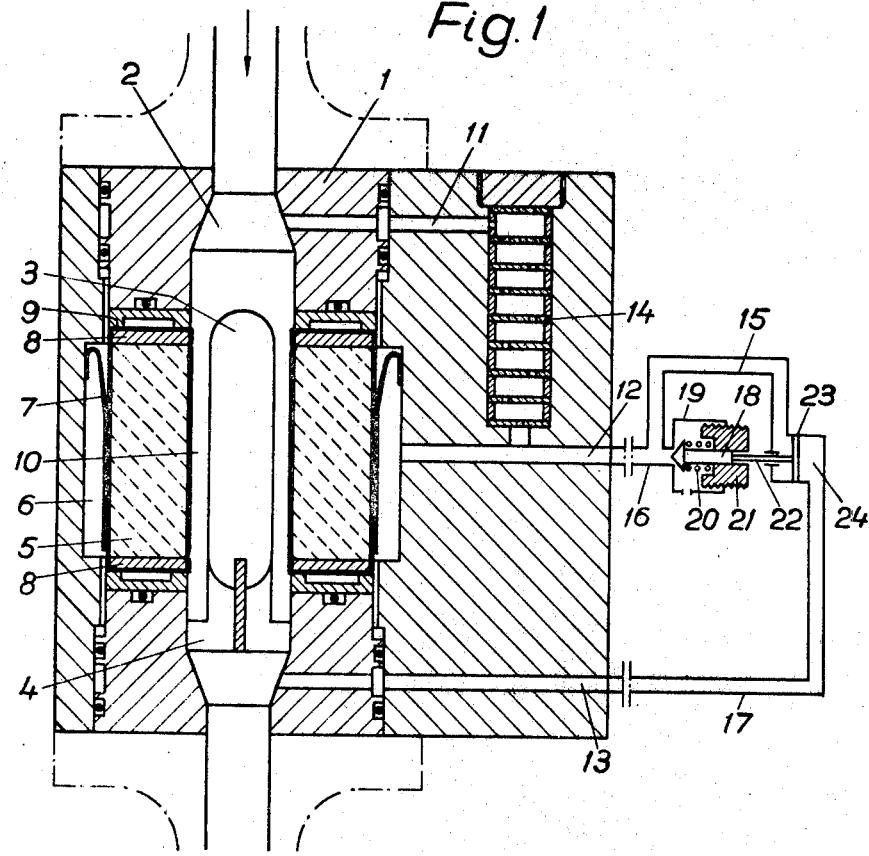
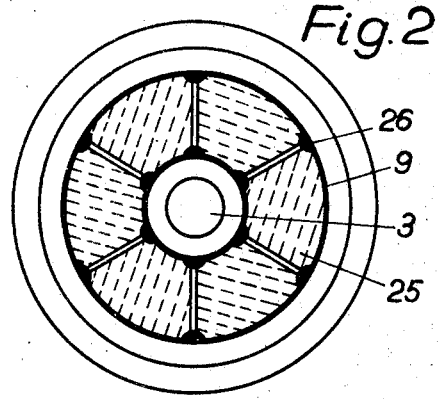
INVENTOR.
PER FRYKLUND
BY 3,495,802
VALVE FOR HIGH PRESSURE OPERABLE IN CONTINUOUS CONTROL
Per Fryklund, Vasteras, Sweden, assignor to Allmanna Svenska Elektriska Aktiebolaget, Vasteras, Sweden, a corporation of Sweden
Filed Oct. 9, 1967, Ser. No. 673,620
Claims priority, application Sweden, Oct. 19, 1966, 14,177/66
Int. Cl. F16l 55/10; F16j 15/46; F16k 31/12
U.S. Cl. 251—5                          6 Claims

ABSTRACT OF THE DISCLOSURE

A valve is constituted by a casing having a passage therethrough and a pin in the passage extending longitudinally thereof; a plurality of blocks are displaceably mounted for movement inwardly by pressure exerted on their outer sides towards the pin to close the passage, the blocks being enclosed in an elastic sack, provided with ribs between the blocks; means are provided to control the valve so as to keep the pressure on the outlet side substantially constant.

FIELD OF THE INVENTION

The invention relates to a valve for high pressure. In certain fields membrane valves are extremely useful. They operate satisfactorily even when the flow-medium is impure, are gas-tight and can be arranged to operate in so-called "continuous control," that is, they are arranged to open and close at such a rate that a certain desired pressure difference is obtained between the supply side and outlet side of the valve. Unfortunately the membrane valve cannot be used for very high pressure for safety reasons.

SUMMARY OF THE INVENTION

The present invention relates to a valve which can be used for the high pressures mentioned above and which otherwise has substantially the same advantages as a membrane valve. The valve is characterised in that a central pin is arranged in a through-channel, its longitudinal axis lying in the longitudinal direction of the channel. Concentrically around this central pin is a ring-shaped valve head which is divided into mutually displaceable blocks. Upon exertion of a pressure on the outer side of the ring, these blocks slide towards each other in the direction of the centre of the ring. In this way the gap is decreased between the pin and the surrounding ring-shaped valve head which tightly encloses the central pin when the valve is completely closed.

So that the blocks can glide as easily as possible, they are arranged between two circular discs of suitable material, preferably Teflon. So that the valve will seal properly the ring-shaped valve head is encased in an elastic sack which leaves the central opening of the valve head free. The sack may be of rubber and is provided with sealing ribs of, for example, metallic material between the blocks. The ribs thus prevent the sack from creeping in between the blocks.

The ring-shaped valve head is tightly fitted in a groove in the wall of the channel, arranged concentrically around the central pin. The surfaces of the groove and the outer sheath surface of the ring-shaped valve head thus limit a space which may be connected to a pressure medium. This pressure medium may be the same as that on the pressure side of the valve. One of the big advantages with a valve according to the invention is that a medium with higher pressure than which the valve is to control is unnecessary to operate the valve.

The invention is best understood with reference to the accompanying FIGURES 1, 2 and 3. FIGURE 1 shows a longitudinal section of the valve provided with a control valve means for "continuous control." On the right of the figure is schematically shown a means for continuous control of the valve. FIGURE 2 shows a cross section of the valve head in FIGURE 1. FIGURE 3 shows a simpler type of control valve to be used when no "continuous control" is needed.

In FIGURE 1, 1 designated the valve housing. Through this runs a channel 2 in which a central pin 3 is arranged. This pin 3 is arranged centrally in the channel 2 and fixed to the walls by a cross 4. A groove has been made in the wall of the channel 2 around the pin 3. A ring-shaped valve head 5 is fitted into the groove. The bottom of the groove and the outer sheath surface of the ring-shaped valve head 5 limit between them a ring-shaped space 6. The valve head 5 is kept centered around the pin 3 by means of centering springs 7. 8 are circular discs of Teflon. The valve head 5 is surrounded by an elastic sack 9 of rubber. In the open position of the valve there is a through-opening 10 between the central pin 3 and the inner sheath surface of the valve head 5. 11, 12 and 13 designate air control channels and 14 is a throttle means connecting the air control channel 11 to the channel 12. The pipes 15, 16 and 17 connect the air control channels to a valve means for the so-called "continuous control." This consists of a valve head 18 arranged in a valve housing 19. This valve head is pressed by a spring 20 against its valve seat. The spring tension may, for example, be set by means of a screw 21. The valve head is connected by means of a piston rod 22 to an operating piston 23. This piston 23 is arranged in a cylinder 24. The pipes 15 and 17 are connected to the spaces on either side of the piston 23.

It is seen from FIGURE 2 that the valve head 5 is divided into a number of blocks 25. These blocks are six in number and are enclosed in the rubber sack 9 which is provided at the adjacent surfaces between the blocks with extra sealing ribs 26, suitably of metallic material. The blocks 25 and their sealings 26 may be varied in many different ways. For instance, the blocks, seen axially, may be given a conical form and turned alternately with narrow side broad end upwards. In this way the length of the valve head is altered when the radial displacement of the blocks takes place. In this case special radial sealing can be voided.

When the valve operated as a closing valve, the operating channel 13 is suitably closed at its entrance into the valve housing. The valve means 18, 19 is replaced by a valve 27, shown in FIGURE 3, which can close the mouth of the channel 12 or connect it to the open air depending on whether the valve head 28 is screwed down or up. When the valve 27 closes, the space 6 is filled through throttle means 14 with pressure medium having the same pressure as that on the supply side of the main valve. Due to the difference in area of the outer sheath of the ring-shaped valve head and its inner sheath, the sector-shaped blocks 25 are pressed towards the central pin and seal very well with the help of the rubber sack against this point. The sealing pressure of the main valve is determined by the difference in diameter chosen between the inner and outer sheath surfaces of the ring-shaped valve head 5.

If a "continuous control" of the main valve is desired, however, the operating-air channels 12 and 13 are connected by the pipes 15, 16 and 17 to the control means shown in FIGURE 1. The pipes 15, 16 are thus connected to the high pressure side of the valve and open into the cylinder 24 to the left of the piston 23. Thus the high pressure endeavours to push the piston 23 to the right and thus open the valve 18, 19 while connecting the pipe 16 to the open air. The pipe 17 is connected through the channel 13 to the low pressure side of the main valve. The pipe 17 opens into the cylinder 24 to the right of the piston 23. Air of low pressure therefore influences the control valve 18, 19 in closing direction. The spring 20 endeavours to keep the valve 18, 19 closed and its tension can be adjusted by the screw 21.

Suppose now that this spring is adjusted by means of the screw 21 to a certain spring tension corresponding to a certain difference in the pressure of the medium in the channel 2 on both sides of the valve. Suppose also that the pressure on the outlet side of the valve is lower than the ideal value adjusted by means of the spring 20. Thus the air pressure in the conduit 15 and thus on the left of the piston 23 is able to force this to the right. The valve 18, 19 opens and the space 6 is connected through the channel 12 and conduit 16 to the open air. The pressure in the space 6 decreases and this means that the pressure medium in the channel 2 is able to expand the ring-shaped valve head 5 so that an opening 10 is formed between this and the central pin 3. Air flows through this opening from the supply side of the valve to its outlet side and the pressure is thus increased on the outlet side. This pressure increase is then sensed on the right of the piston 23 in the cylinder 24. At the same time the pressure to the left of the piston 23 has decreased. When the pressure on both sides of the piston 23 is sufficiently altered the piston is again moved to the left and the valve 18, 19 closes the pipe 16. The pressure again increases in the space 6 and also in the cylinder 24 to the left of the piston 23 to the same value as that in the channel 2 on the supply side of the valve. This pressure increase causes the blocks 25 once again to move towards the central pin 3 and the valve is closed. The pressure drops again on the outlet side of the valve and consequently also decreases in the cylinder 24 on the right of the piston 23. When the pressure is sufficiently altered on both sides of the piston 23, this is again moved to the right and the above-described control process is repeated. The ring-shaped valve head will thus perform opening and closing movements at such a rate that the desired pressure set by means of the spring 20 and the screw 21 is obtained on the outlet side of the main valve. These movements are very slight and are never completed. Instead the valve head will fluctuate at a certain distance from the central pin, that is perform the described control movements around a middle position at said distance from the central pin.

What is claimed is:

1. Valve for high pressure, characterized in a body having a through-channel, a central pin fixed in the through-channel with its longitudinal axis lying in the longitudinal direction of the channel, and a ring-shaped valve-head placed concentrically around the pin, said valve-head having an inner surface forming a part of the through-channel and a larger outer surface concentrical with said inner surface area, the valve-head being divided into mutually displaceable blocks which are mounted to slide towards each other in the direction of the center of the ring, and controllable means to subject said larger outer surface to fluid pressure, thus decreasing the gap between the pin and the inner surface of the surrounding, ring-shaped valve-head which tightly encloses the pin when the valve is completely closed.

2. Valve for high pressure according to claim 1, characterized by an elastic sack encasing the ring-shaped valve-head which leaves the central opening of the valve-head free.

3. Valve for high pressure according to claim 1, characterized in that the body has a groove around the pin in the wall of the through-channel forming a space connected to the through-channel in which groove the blocks fit and which space is limited by the surfaces of the said larger outer surface of the valve-head.

4. Valve for high pressure according to claim 3, characterized by a throttle means connecting the inlet side of the through-channel to said space.

5. Valve for high pressure, characterized in a body having a through-channel, a central pin arranged in the through-channel with its longitudinal axis lying in the longitudinal direction of the channel, and a ring-shaped valve-head placed concentrically around the pin, the valve-head being divided into mutually displaceable blocks which are mounted to slide towards each other in the direction of the center of the ring in response to pressure on the outer side of the blocks, thus decreasing the gap between the pin and the surrounding, ring-shaped valve-head which tightly encloses the pin when the valve is completely closed, and an elastic sack encasing the ring-shaped valve-head which leaves the central opening of the valve-head free.

6. Valve for high pressure according to claim 1, in which said controllable means includes means to conduct fluid from the through-channel upstream of the valve to the outside of the ring-shaped valve-head.

References Cited

UNITED STATES PATENTS

| | | | |
|---|---|---|---|
| 1,586,923 | 6/1926 | Townsend | 277—34 X |
| 1,731,571 | 10/1929 | Heare | 251—5 X |
| 2,516,029 | 7/1950 | Swindin | 251—9 |
| 2,642,942 | 6/1953 | Reynolds | 251—1 X |
| 2,746,709 | 5/1956 | Minor | 251—5 X |

FOREIGN PATENTS 59,025   11/1936   Norway.

WILLIAM F. O'DEA, Primary Examiner

RICHARD GERARD, Assistant Examiner

U.S. Cl. X.R.

138—46; 277—34, 72